Dec. 13, 1949  W. L. ZINK ET AL  2,490,894
TRACTOR MOWER
Original Filed June 1, 1940  4 Sheets-Sheet 1
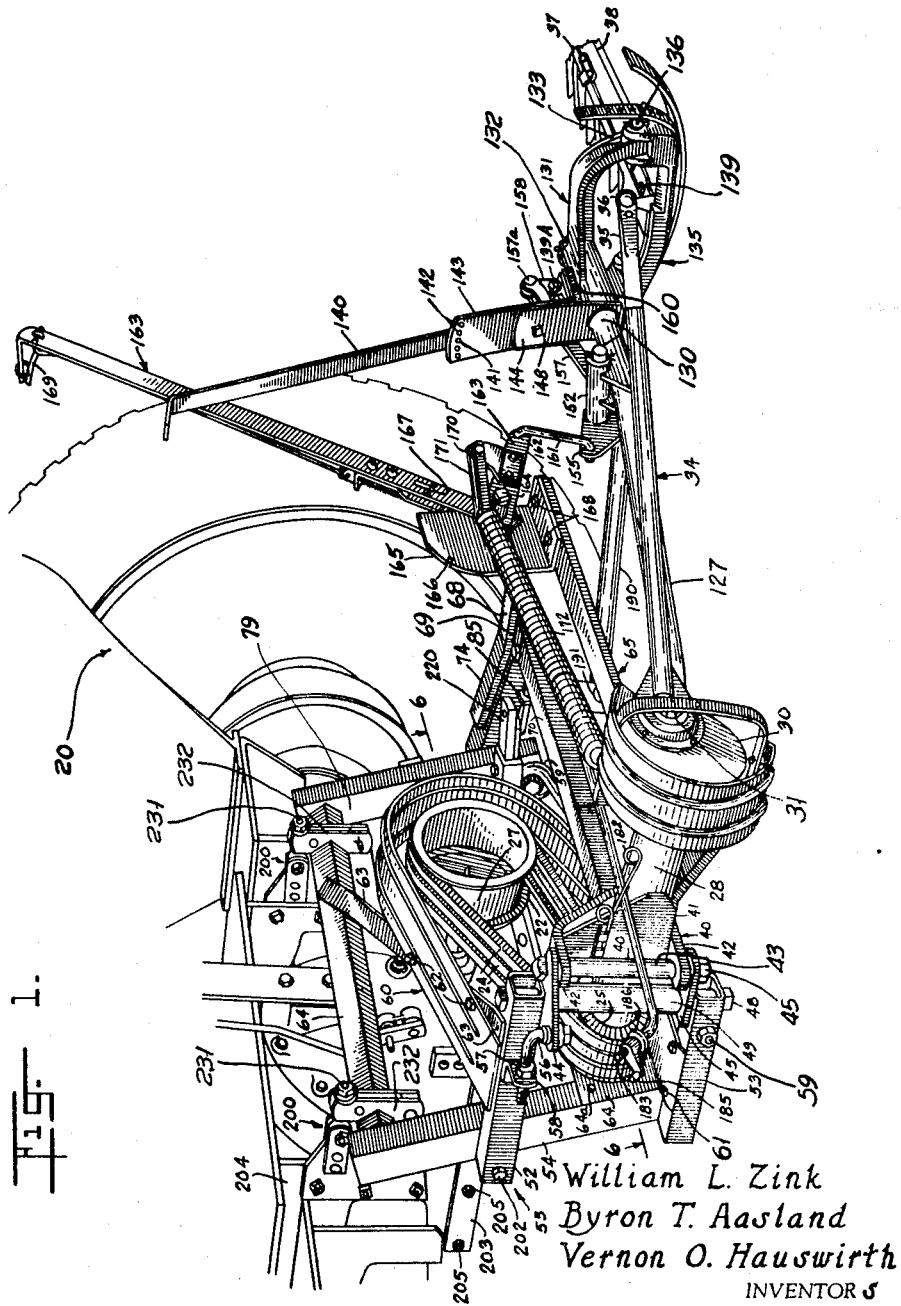
William L. Zink
Byron T. Aasland
Vernon O. Hauswirth
INVENTORS
BY
ATTORNEY

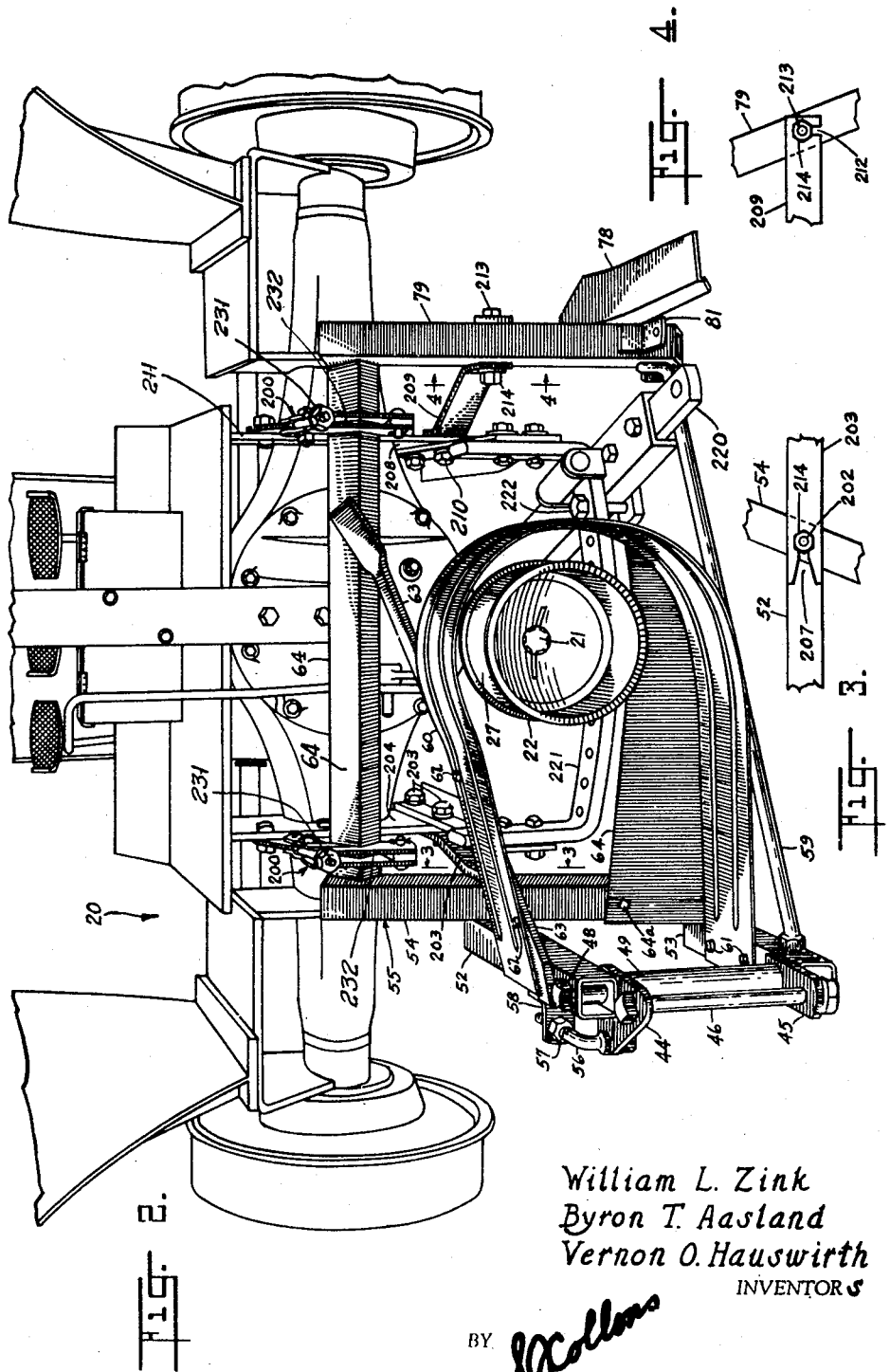

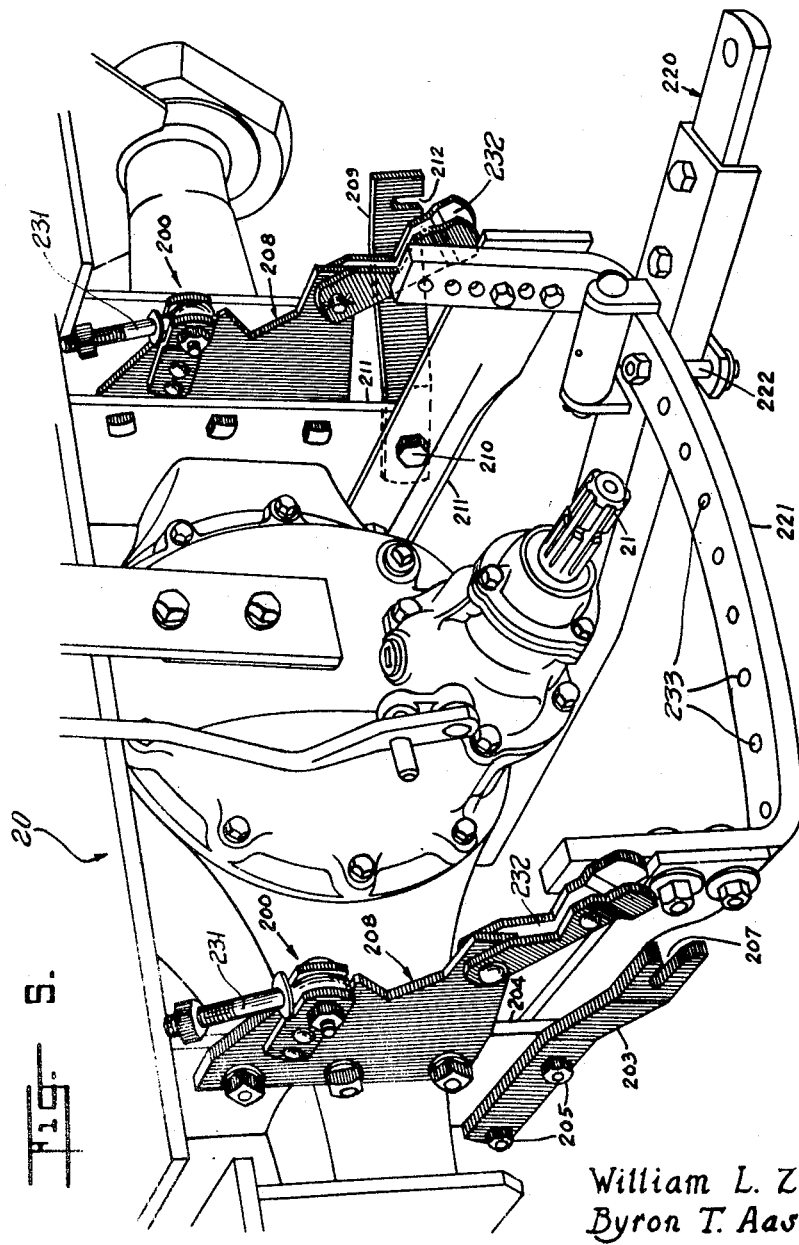

Dec. 13, 1949 W. L. ZINK ET AL 2,490,894
TRACTOR MOWER
Original Filed June 1, 1940 4 Sheets-Sheet 4

William L. Zink
Byron T. Aasland
Vernon O. Hauswirth
INVENTORS

BY
ATTORNEYS

Patented Dec. 13, 1949

2,490,894

UNITED STATES PATENT OFFICE 2,490,894

TRACTOR MOWER

William L. Zink, Plano, and Byron T. Aasland and Vernon O. Hauswirth, Kankakee, Ill., assignors to Sears, Roebuck and Co., Chicago, Ill., a corporation of New York Original application June 1, 1940, Serial No. 338,354. Divided and this application January 19, 1945, Serial No. 575,322

3 Claims. (Cl. 56—25)

This is a division of our co-pending application Serial No. 338,354, filed June 1, 1940, now Patent 2,371,206, issued March 13, 1945, entitled "Tractor mower."

This invention pertains to farm implements, and is concerned more particularly with those of the tractor mounted type.

A principal object of the present invention is to provide a supporting structure for mounting pull-behind farming apparatus on farm tractors so as to enable speed and facile application and detachment of such apparatus under conditions of power take-off coupling to the drive shaft of said tractors.

Further objects and advantages of the invention will appear as the description proceeds.

The invention will be better understood upon reference to the following description and accompanying drawings, in which:

Fig. 1 is a fragmentary perspective view of the rear of a mower mechanism mounted on a tractor and driven from the tractor power take-off;

Fig. 2 is a perspective view looking downward from the rear and showing essentially only the mounting frame for supporting a mower and operating mechanism therefor;

Fig. 3 is a fragmentary detail elevational view taken as indicated by the line 3—3 in Fig. 2;

Fig. 4 is a view taken as indicated by the line 4—4 in Fig. 2;

Figure 6:
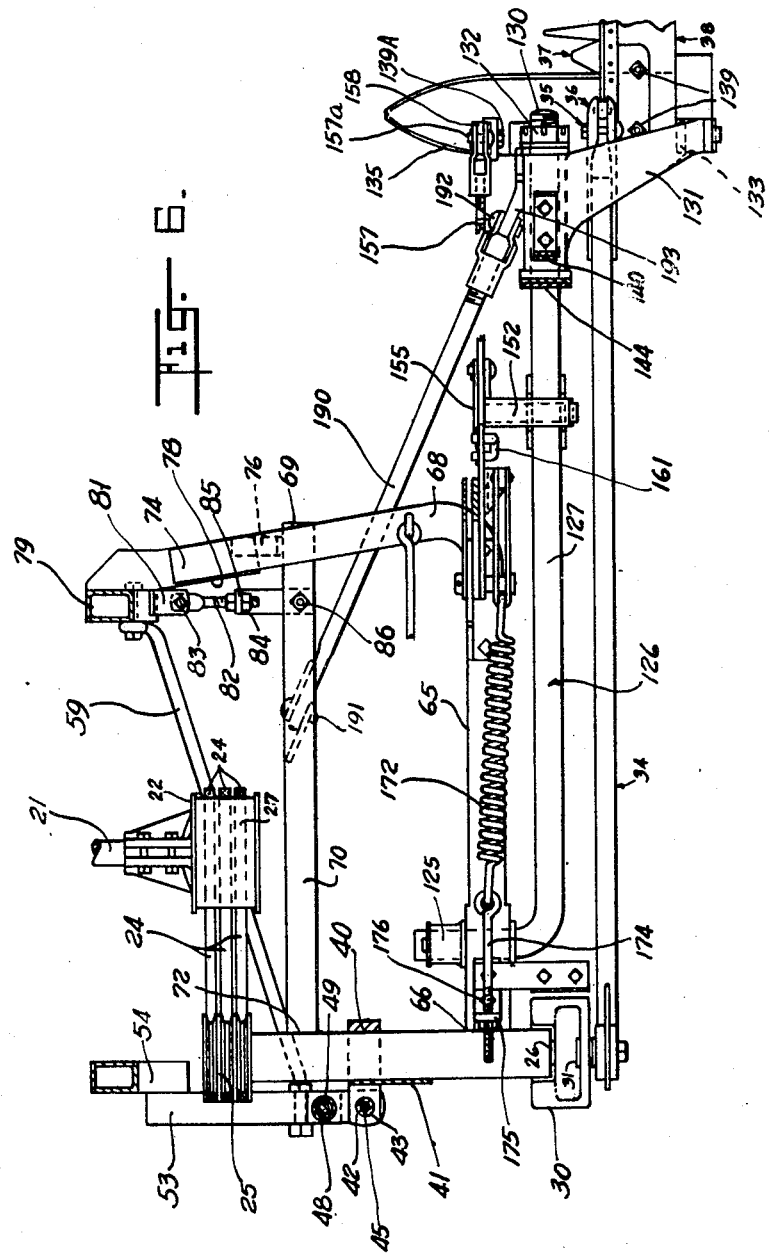

Fig. 5 is a perspective view taken from approximately the same viewing angle as Fig. 1 somewhat enlarged but shows only the supporting mechanism by which the mounting frame of the mower is readily attachable to and detachable from the tractor, and Fig. 6 is a fragmentary plan sectional view taken as indicated by the line 6—6 in Fig. 1, certain portions of the structure of Fig. 1 being omitted for the sake of clarity.

Referring now more particularly to the drawings, there is illustrated the rear part of a tractor 20 having a propeller shaft power take-off extension 21 on which is detachably mounted a pulley 22. Belts 24 which are preferably of the V type are trained about said pulley and also about a driven pulley 25 mounted on a driven shaft 26. The driving surface 27 of the pulley 22 is preferably smooth for the purpose of enabling the belts to find their proper places of alinement and to afford slippage between the same and the belts when the mower becomes fouled and cannot reciprocate, as will appear. The driven pulley 25 preferably has V-grooves accommodating the V-belts for affording the desired degree of traction for the transmission of power and positively positioning the belts thereon. The driven shaft 26 is journaled in a steel tube 28, said shaft terminating rearwardly in a flywheel or counterweighted crank disc 30, to which is eccentrically connected as at 31 the drive end 32 of a pitman 34. A clamp head 35 at the opposite end of the pitman has a universal ball-and-socket connection at 36 with the movable knife 37 slidably supported by the cutter bar 38 of a mower.

The knife 37 is normally given a reciprocating movement in response to the rotation of the pulley 22. However, should the movement of the knife be prevented, as by an obstruction, the belts 24 will slip, so that injury to the operating parts will be avoided.

Welded or otherwise suitably fastened to the tube 28 is a yoke 40 which may be strengthened as by a gusset 41 preferably integrated with the tube, the upper and lower arms 42 of the yoke 40 are connected together by a sleeve 43 and disposed between upper and lower belt tightener swing plates 44 and 45, respectively, a pivot bolt 46 extending through said arms, sleeve and plates. The plates 44 and 45 are joined by a sleeve 49 through which extends a pivot bolt 48, the ends of the bolt 48 being supported in upper and lower tubular members 52 and 53 welded or otherwise suitably secured to the left upright 54 of a mounting frame 55. An angle bolt 56 pivotally connected to the upper swing plate 44 and adjustably connected at 57 to a bracket 58 on the upper bar 52 may be regulated to position the swing plates 44 and 45 and the pivot bolt 45 to the right or left, as the case may be, causing corresponding disposition of the torque tube 28 and hence of the driven pulley 25 for taking up slack in the belts 24 and for enabling the belts to be applied to and removed from the respective pulleys 22 and 25. The frame 55 is rigidified by a brace rod 59.

A belt guard 60 has its lower end secured as at 61 to the lower bar 53 and its upper arm secured as at 62 to a brace bar 63, one end of which may be welded or otherwise suitably secured to the upper tube member 52 and the other end to the upper horizontal tube or bar 64 of the mounting frame 55. A wing 64 on the belt guard may be secured as at 64a to the left upright 54 of the mounting frame 55.

A swinging frame in accordance with our invention includes the tube 28 and a beam 65 having an end welded or otherwise suitably fixed to the tube 28 as at 66, Fig. 6, said beam including a lateral arm and a forwardly extending arm 68 welded as at 69 to the adjacent end of a transversely extending forward bar 70 whose other end is welded or otherwise suitably fixed as at 72 to the tube 28. Thus the tube 28, beam 65 and forward bar 70 form a rigid frame. The arm 68 of the beam 65 has an inclined skid portion 74. Fastened to the bar 70 is a bracket 76 inclined forwardly and downwardly, the portions 74 and 76 providing a flared guide for receiving a tongue 78 welded or anchored in any other suitable fashion to the right hand upright 79 of the mounting frame 55, to assist in the support of the swinging frame.

Welded or otherwise suitably fastened to the upright 79 in accordance with an illustrative form of the invention is a bracket 81, Fig. 2, to which an adjusting rod 82 is pivotally connected as by a release member such as a shear bolt 83. The rod 82 is adjustably connected as at 84 to an arm 85 pivoted as at 86 to the frame bar 70.

As is evident from Fig. 6, the swinging frame is capable of turning about the pivot bolt 46 in a clockwise sense, so that the pulley 25 is swung into and out of the operative position shown in Fig. 6 should the mower blade 37 become stalled as by an obstruction, the continued forward movement of the vehicle will shear the safety bolt 83, causing the kinfe and associated mechanism, together with the swinging frame on which the same are mounted, to swing clockwise and rearwardly, about the pivot bolt 46, so that no damage is suffered other than the shearing of the bolt.

It is to be observed from the foregoing that the swinging frame as well as the mowing and associated mechanism carried thereby are swingable as a unit about the axis of the pivot bolt 45 in the direction to shear the shear bolt 83 or in the opposite direction during reinstatement. The swing in said opposite direction may be done by hand lifting or by backing the tractor, the tongue 78 cooperating with the guide elements 74 and 76 at the final portion of reinstatement.

During reinstatement of the frame, the belts are slipped into the grooves in the pulley 25 and the swinging frame is shifted still further by the adjusting bolt 56 until slack in the belts is taken up. A new shear bolt 83 is inserted in place of the spent one, and the adjusting rod 82 connected thereto and to the arm 85. The rod is adjusted relative to the arm 85 to the extent necessary to secure the axis of the pulley 25 parallel with the axis of the pulley 22, whereupon power may be properly transmitted. The securement of the rod 82 in adjusted position establishes the swinging frame against movement relative to the mounting frame 55. Should the belts thereafter become slack, this slack can be taken up by an adjustment of the bolt 56 and, if necessary of the rod 82. This will involve a slight shift of the swinging frame to the left, but inasmuch as the arm 85 is pivotally connected at 86 to the bar 70, and the rod 82 is pivotally connected to the bracket 81 by the shear bolt 83, this lateral movement of the swinging frame will not be interfered with, the adjustment between the rod 82 and arm 85 being changed to the degree necessary to take up belt slack.

It will be observed that the mower blade and the means by which it is supported by the swinging frame 73 are both mounted outboard of said frame, with the result that a stress is applied to the laterally extending portion of the beam 65, which is communicated to the tube 28. It is further to be noted that the mower blade and supporting and operating mechanism therefore are located at one side of the tube and, through the bars 65 and 70, tend to twist the tube 28 about its axis clockwise, Fig. 2. These stresses are very substantial and if, in place of the tube 28, a flat bar were used, as is conventional, the bar would have to be made exceedingly heavy to withstand such stresses without distortion. In accordance with our invention, the tubular form of the element 28 affords all of the resistance to both forms of torsional stresses without the weight that would be necessary in the conventional construction.

Pivotally connected as at 125 to the swinging beam 65 is a yoke bar assembly 126 comprising a bar 127 the free end 130 of which swivelly carries a yoke 131 retained as by a nut 132. The yoke 131 has depending arms 133 and 134 to which the inner shoe 135 of a mower knife bar is pivotally connected as at 136 and 137. The shoe 135 is rigidly connected as at 139 to the knife bar 38 to which the knife 37 is slidably connected as aforesaid, and on the other end of the knife bar 38 is the outer shoe (not shown), whereby the knife bar and associated knife are supported from the ground at an elevation.

Mounted on the yoke 131 as at 139A is a spring tilting lever 140 having a pin 141 selectively receivable in any one of a series of holes 142 in a quadrant 143 supported on the plate 144 welded or otherwise suitably mounted on the yoke bar 127. The quadrant is held in nested relation to the plate 144 as by a bolt 148, extending through an elongated slot in the quadrant 143 to allow the quadrant to be adjusted in respect to said plate. A retainer spring (not shown) engages the tilting lever 140 and presses the same against the quadrant 143 to thereby insure against rattling therebetween. The lever may be pulled away from the quadrant against its own resilience and the pressure of the retainer spring 150, to remove the pin 141 from one hole 142, and then the lever may be swung to shift the pin 141 into line with another hole.

Pivotally supported in a sleeve 152 welded or otherwise suitably mounted on the yoke bar 127 is a lift crank 155 connected as by a link 156 to a bar 157 whose other end is pivotally connected as at 157a to a bar 158 connected at 159 to a lug 160 on the shoe 135 so as to cause said shoe to move with the bar 158 as a unit. The lift crank 155 is connected by a link 161 with the arm 162 of a bell crank lifting member 163, which is pivoted at 164 to a bracket 165 having a notch 166 for receiving a spring-pressed latch 167 carried by said lifting member 163, the bracket being secured as at 168 to the swinging beam 65. The latch is retracted when a handle 169 on the arm 163 is pulled. An ear bracket 170 fastened to the lever arm 163 is connected as by a link 171 to an end of a helper spring 172, the other end of the spring 172 being connected to an adjustable rod 174 securable in a bracket 175 mounted as at 176 on the beam 65.

When the mower knife is in operating position, the parts are arranged as shown in Figs. 1 and 6. Otherwise, the knife and associated bar are raised to a substantially vertical position. To accomplish this, the operator grasps the handle 169 on the lifting arm 163 so as to retract the spring-pressed pawl or latch 167 supported thereon sufficiently to enable the latch to clear the top of the quadrant 165, and pulls the lever 163 from right to left until the latch engages in the notch 166 in the quadrant. By this action, which is assisted by the helper spring 172, the lifting arm 162, acting through the link 161, swings the crank 155 in a clockwise direction, looking from the rear toward the front, with the result that the link 156 causes the link 157 to swing the bar 158 to the left, first raising the lower shoe, if they are at different levels, and then causing the shoes, knife and knife bar to turn as a unit about the axis 125 of the yoke bar. The bolt 164 engages the strap 171 to prevent over-centering or toggle action of the helper spring. When this swing of the lifting member 163 is completed, the knife and cutter bar extend at an angle of approximately 20 degrees to the ground. Of course, this angle may be varied as desired. Thereupon, the operator lifts the cutter and cutter bar by hand to a substantially upright position whereupon a retainer rod 180, pivotally anchored to the frame bar 65 as at 181, and normally held in inoperative position by an anti-rattle spring 182, suitably mounted as on the gusset 41, as shown in Fig. 1, is swung over and its threaded end passed through a hole 184 in the cutter bar 38 after a nut 185 is removed from said end 183. This nut is then applied to said end 183 at the far side of the cutter bar, said nut cooperating with a shoulder 186 on the rod at the near side of the cutter bar to tightly connect the cutter bar to the rod.

When the cutter apparatus is to be let down the cutter bar is disconnected from the rod 180 and the latter swung counter-clockwise and allowed to rest where it is held against rattling by the spring 182 as noted above.

The yoke 131 is braced by means of a brace bar 190 pivotally conected as at 191 to the underside of the frame bar 70 and also pivotally connected as at 192 to an extension 193 of the yoke arm.

Means is provided for quick detachment and attachment of the mounting frame 55 relative to the tractor. The tractor has clamping devices 200 adapted to detachably hold the upper frame bar 64 of the mounting frame 55 or to secure the corresponding bars of frames of cultivators or other tractor mounted tools. The upright 54 has a bolt or pin 202 projecting preferably inward to the right, Fig. 2, and a locating bar 203 fastened to a suitable stationary part 204 as at 205, projects rearwardly therefrom and has a slot 207 into which the pin 202 is slipped as the frame 55 is moved forwardly or the tractor is backed into place. The top bar 64 of the frame comes to rest in the angularly notched seats 208 of the clamping devices 200. A second locating bar 209 has a forward portion pivotally connected as at 210 to a suitable stationary part 211, and is adapted to swing down and receive in its slot 212 a pin or bolt 213 carried by the upright 79. When the top bar 64 of the frame is resting in the sockets 208 of the clamping devices 200 and the respective pins 202 and 213 of the uprights 54 and 79 are received in the corresponding slots of the locating bars 203 and 209, as shown in Figs. 2, 3 and 4, the frame 55 is properly located whereupon the clamping devices 231 and 232 are tightened upon the top bar 64 and nuts 214 applied to the free ends of the pins to clamp the bars 203 and 209 and thus rigidly support said frame.

The tractor may be provided with a draw bar 220 adapted to be used when a trailing apparatus such as a plow, disc harrow or the like is to be used instead of a mounted tool such as a cultivator or the mower. For this purpose there is provided a draw bar support 221 and bolts 222 adapted to be inserted in holes 233 at opposite sides to lock the draw bar against drifting. The mounting frame 55 is so constructed and held by the clamps 200 and 232 and locating bars 203 and 209 that neither such frame nor the remainder of the apparatus cooperating therewith is interfered with by the draw bar. Yet, if it is desired to replace the mounted tool and associated structure, by another mounted tool or by a drawn tool, it is necessary merely to remove the pulley 22, unclamp the bars 203 and 209 from the respective uprights 54 and 79, release the clamps 200 and 232 and swing the bar 209 upward free of the pin or bolt 213, whereupon the tractor may be driven forward slightly to completely free it of the mounting frame 55 and the apparatus connected therewith. Thereupon, the top bar of a cultivator or other mounted tool, corresponding to the top bar 64 of the mounting frame 55, may be secured to the clamping devices 200, or, if a trailing apparatus is to be employed, the same may be connected to the draw bar 220 and the locking bolts 222 removed to allow the draw bar to have free swing between the ends of the support 221, or shifted to lock the draw bar at any position desired for use.

Various modifications may suggest themselves to those skilled in the art without departing from the spirit of our invention, and, hence, we do not wish to be restricted to the specific form shown or uses mentioned, except to the extent indicated in the appended claims, which are to be interpreted as broadly as the state of the art will permit.

We claim:

1. A mounting for a tractor-operated tool, said mounting comprising a frame having a transverse member and spaced uprights connected to said member, tractor supported means engageable with forward and under portions of said member and with a part on one of said uprights at a point substantially spaced from said member, as said frame and tractor are mutually approached, whereby said frame is retained against forward and downward movement, and a movable member supported by said tractor and movable into engagement with a rear portion of a part on the other upright while said frame is thus supported, whereby said frame is held temporarily at rest, and means operative for releasably securing said member and uprights in said positions of rest.

2. A supporting apparatus for detachably mounting pull-behind mowers onto farm tractors comprising, a pair of mounting plates bolted parallelly one on each side of a farm tractor differential and power take-off housing, said mounting plates having transversely aligned angle-notched seats and each pivotally supporting a yoke bracket and a yoke bracket tie bolt, a coupling frame for detachable engagement with said mounting plates comprising a pair of vertically disposed transversely spaced tubular uprights, a tubular tie welded to and connecting said uprights having polygonal cross-section and disposed to present one of its polygonal corners for seating in the angle-notched seats of said mounting plates, and a pair of strut bars bolted to the farm tractor having locating pin and slot engagement with said coupling frame uprights and for relieving torque strains imparted by said mounting plates to said coupling frame tie.

3. Apparatus for coupling pull-behind mowers to farm tractors comprising, a pair of vertical plates bolted parallelly one on each side of a tractor power take-off housing, said plates having transversely aligned notches and each carrying a shackle for securing a frame member seated in its associated one of said notches, a coupling frame for detachable engagement with said plates comprising a pair of vertically disposed transversely spaced uprights, a horizontal tie welded to and connecting said uprights having a cross-section for seating in the notches of said plates, and a pair of strut bars secured in the farm tractor having engagement with said coupling frame uprights for additionally securing said coupling frame to the tractor.

WILLIAM L. ZINK.
BYRON T. AASLAND.
VERNON O. HAUSWIRTH.

REFERENCES CITED

The following references are of record in the file of this patent:

UNITED STATES PATENTS

| Number | Name | Date |
| --- | --- | --- |
| 219,251 | Green | Sept. 2, 1879 |
| 273,994 | Hyle | Mar. 13, 1883 |
| 314,789 | Bole | Mar. 31, 1885 |
| 619,166 | Gragert | Feb. 7, 1899 |
| 1,275,599 | Reed | Aug. 13, 1916 |
| 1,947,552 | Huddle | Feb. 20, 1934 |
| 2,065,869 | Owens | Dec. 29, 1936 |
| 2,082,260 | Reid | June 1, 1937 |
| 2,159,165 | Kling et al. | May 23, 1939 |
| 2,239,986 | Blood | Apr. 29, 1941 |
| 2,248,332 | Boudelier et al. | July 8, 1941 |
| 2,275,259 | Johnson et al. | Mar. 3, 1942 |
| 2,305,959 | Fredricksen | Dec. 22, 1942 |
| 2,314,216 | Hilblom | Mar. 16, 1943 |
| 2,355,272 | Cardwell | Aug. 8, 1944 |
| 2,376,406 | Weingart | May 22, 1945 |